United States Patent
Melin

[15] 3,657,013
[45] Apr. 18, 1972

[54] ELECTROCHEMICALLY ACTIVE MATERIAL, CONSISTING CHIEFLY OF NICKEL HYDROXIDE, FOR POSITIVE ELECTRODES IN ALKALINE ACCUMULATORS, AND PROCEDURE FOR ITS MANUFACTURE

[72] Inventor: Ake Lennart Melin, Oskarshamn, Sweden

[73] Assignee: Svenska Ackumulator Aktiebolaget Jungner, Oskarshamn, Sweden

[22] Filed: Feb. 26, 1970

[21] Appl. No.: 14,548

[30] Foreign Application Priority Data

Mar. 11, 1969 Sweden...................................3353/69

[52] U.S. Cl.................................................136/28, 136/29
[51] Int. Cl........................................................H01m 43/04
[58] Field of Search.............136/28, 29, 154; 252/472, 473, 252/519, 54

[56] References Cited

UNITED STATES PATENTS

| | | | |
|---|---|---|---|
| 2,969,413 | 1/1961 | Peters | 136/29 |
| 3,066,178 | 11/1962 | Winkler | 136/29 |
| 3,108,910 | 10/1963 | Herold | 136/29 |
| 3,156,657 | 11/1964 | Pinder et al. | 252/473 |
| 3,211,587 | 10/1965 | Shair et al. | 136/28 |

*Primary Examiner*—Winston A. Douglas
*Assistant Examiner*—C. F. Lefevour
*Attorney*—Sughrue, Rothwell, Mion, Zinn & Macpeak

[57] ABSTRACT

Electrochemically active material consisting essentially of nickel hydroxide for use as a positive electrode in alkaline accumulators, the electrochemically active material containing from 0.05 to 5.0 percent by weight, based on the weight of the nickel hydroxide, of a sulfate of at least one metal selected from the group consisting of barium, strontium, mercury and antimony, the electrochemically active material being substantially free of residual alkali metal sulfate, and a process for producing the same are disclosed.

7 Claims, 2 Drawing Figures

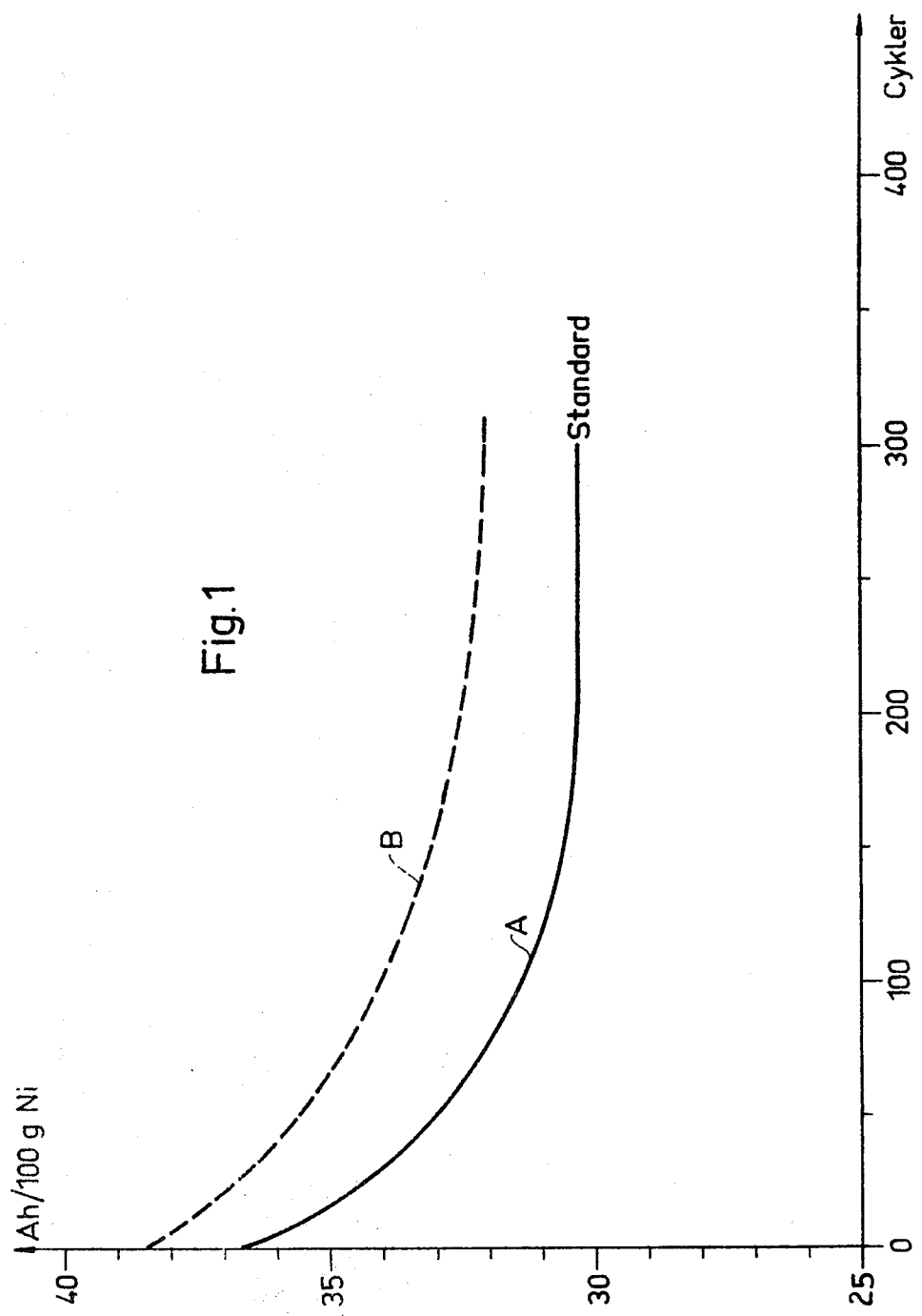

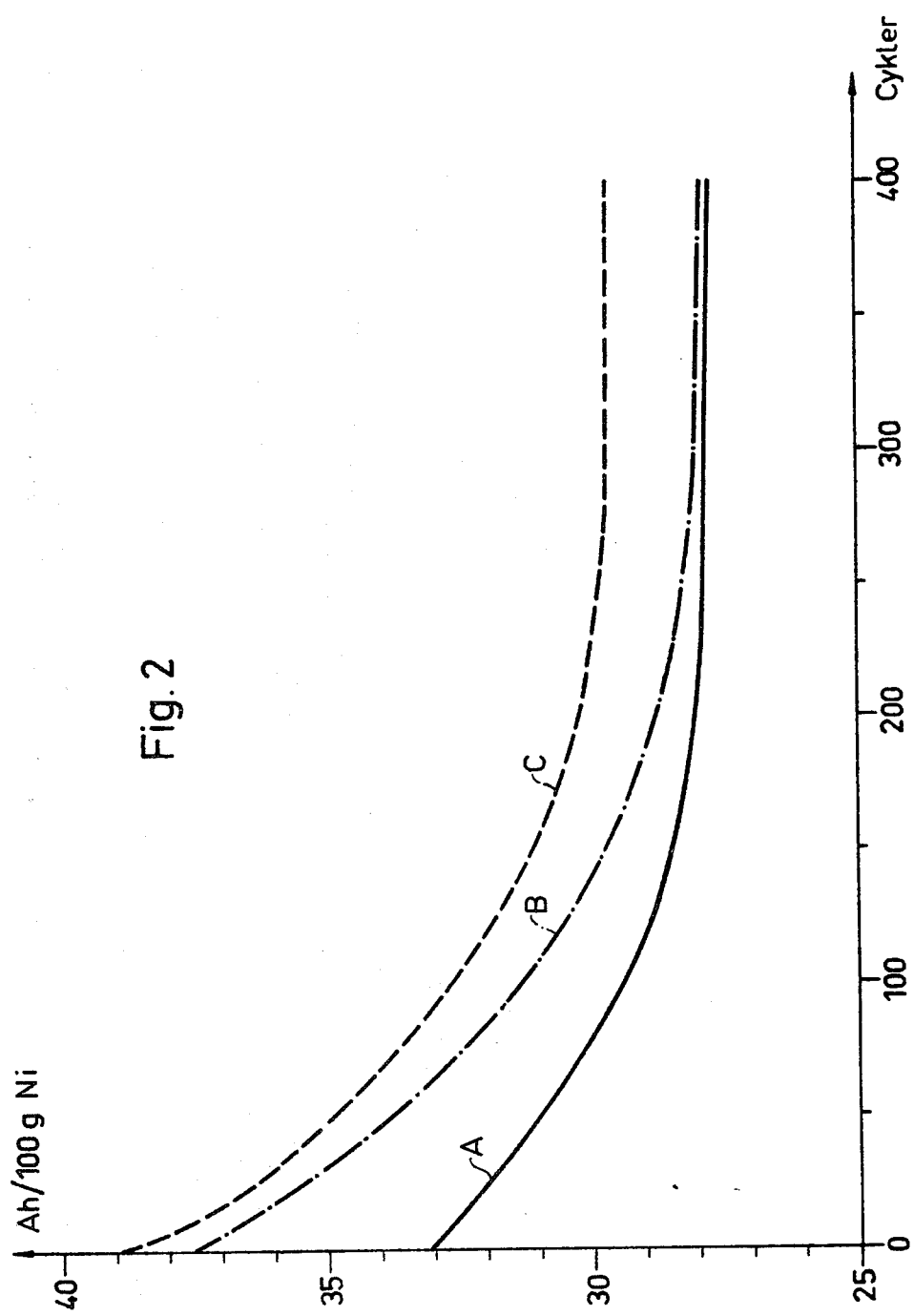

ELECTROCHEMICALLY ACTIVE MATERIAL, CONSISTING CHIEFLY OF NICKEL HYDROXIDE, FOR POSITIVE ELECTRODES IN ALKALINE ACCUMULATORS, AND PROCEDURE FOR ITS MANUFACTURE

Electrochemically active material, consisting chiefly of nickel hydroxide, for positive electrodes in alkaline accumulators can be produced either in batches or continuously.

In the former case the procedure is that a solution of a metallic salt, for example nickel sulphate, is made to run down into a large precipitation tank containing caustic soda. Usually the quantity of the two components in the reaction entails a time of about half an hour for addition of the metal solution. The suspension is thereafter left to stand for 8 to 15 hours and the precipitation is then concluded by adding more caustic soda for about 10 minutes. The precipitate is filtered off and washed, dried in a dehydrator, washed and dried again, and ground, graphitized, compressed, crushed and screened. In every such process, accordingly, one obtains a batch of nickel hydroxide compound and the compound from 10 to 15 batches is customarily mixed in a mixing drum to obtain a uniform composition of the compound.

In this way one obtains to some extent a nickel hydroxide compound of standard type which is then used for different types of alkaline accumulators with pocket electrodes, both those which are to have a high capacity and those for which loadability is a primary requirement.

According to the continuous procedure, which was first proposed in our patent application 1368/1969, an electrochemically active material of this kind is produced in the form of one or more metallic hydroxides by precipitation of the hydroxide or hydroxides from a solution of one or more metallic salts with the aid of an alkaline metal hydroxide solution, by letting the precipitation take place in at least one step in order to obtain a uniform crystal structure of the material (i.e. the same X-ray crystallinity throughout the material), and by letting the metallic solution and the caustic soda run down simultaneously into a reaction vessel, the pH value, temperature and concentration being kept constant during each step of the precipitation. During the first precipitation step the said three quantities are so adjusted that the precipitation product obtains a crystal structure corresponding to the desired electrochemical properties of the end product.

After the first precipitation step a second precipitation step is usually employed during which the greater part of the anions of a metallic salt or metallic salts absorbed in the hydroxide precipitate are released without alteration of the crystal structure of the hydroxide precipitate which was fixed in the first precipitation step.

Both in the batchwise and in the continuous precipitation procedure the end product contains sulphate which is formed in the precipitation in, for example, the following manner:

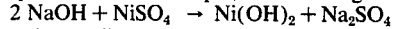

$2\,NaOH + NiSO_4 \rightarrow Ni(OH)_2 + Na_2SO_4$

In order, inter alia, to remove this residual content of sulphate, one or more washing operations are employed both in the batchwise and in the continuous procedure. The reason for this is that sulphate in too large quantities may be harmful since, depending on the electrolyte used in the final battery, either $Na_2SO_4$ or $K_2SO_4$ crystals are formed at low temperatures, the which crystals may constitute a mechanical hindrance to the migration of ions between electrode and electrolyte.

In batchwise precipitation procedures the residual sulphate usually amounts to 0.4 to 0.6 percent, while with the continuous precipitation procedure sulphate contents between 0.1 and 1.2 percent have been obtained, the variation being dependent chiefly on the pH value chosen in the second precipitation step.

The invention is based on an observation made by the inventor in conjunction with testing of batteries with nickel oxide compounds in the positive electrodes, produced both by the batchwise and by the continuous procedure, with different contents of residual sulphate. As is known, accumulator batteries are formed and cycled in conjunction with their preparation by being charged and discharged a few times. Life tests of accumulator batteries are usually made by means of a large number of cyclical charges and discharges. Through the investigations on which this invention is based it has been found that, in a comparison between cycled and uncycled (solely formed) compound, no significant differences in chemical composition existed except in respect of sulphate content. Whereas the uncycled compounds had varying sulphate contents, all cycled compounds had lost sulphate, which was no longer present in demonstrable quantities. A certain reduction of the specific area was found after cycling, and some increase of the X-ray crystallinity. This increase was so slight, however, that it could no alone explain the reduction of capacity found in the cycling.

From this the conclusion was drawn that small quantities of sulphate bound in a $Ni(OH)_2$ crystal lattice may obstruct the growth of crystals in the material during electric cycling and thus delay the reduction of capacity during cycling; in other words one can thereby obtain some conservation of the capacity properties. In alkaline accumulators with electrochemically active material consisting essentially of nickel hydroxide the sulphate is bound in the form of basic Ni sulphates which are relatively quickly broken down during cycling.

The object of the present invention is to delay the reduction of capacity during cycling in such accumulator batteries and possibly also to allow a rather higher final residual sulphate content in an electrochemically active compound prepared through precipitation of hydroxide or hydroxides from a solution of one or more metallic salts with the aid of an alkaline metal hydroxide solution, said compound consisting essentially of nickel hydroxide, the invention being characterized essentially in the fact that, in the residual sulphates obtained in the precipitation, a sulphate of a metal other than that or those forming the active material is bound which is difficult to dissolve in the alkaline electrolyte.

The invention also relates to a material produced by this procedure, which thus contains a sulphate, difficult to dissolve in the alkaline electrolyte, of a metal other than that or those forming the active material.

According to one embodiment of the invention the metallic compound which produces the difficulty soluble sulphate is added to the electrochemically active material at a time in the precipitation of the active material such that the difficulty soluble sulphate will be rigidly fixed in the crystal lattice of the active material. The added metallic compound should preferably contain one of the metals barium, strontium, mercury or antimony. A suitable content of the difficultly soluble sulphate in the active material is 0.05 to 5.0 percent, preferably 0.25 to 0.50 percent of the weight of the total active material.

A practical method of binding the sulphate in a form which is very difficulty soluble in the electrolyte is to add, for example, a barium hydroxide solution to the active material. The sulphate is thereby bound in the crystal lattice as barium sulphate, which is a sulphate that is very difficult to dissolve in the electrolyte.

The advantages gained from said treatment of the active compound are as follows:

1. Stability is gained in the capacity properties of the compound.
2. The forming electrolyte is not polluted by sulphate in the compound and this electrolyte may thus be used also, if desired, as electrolyte for sale.
3. A somewhat improved capacity of the compound is obtained in general through treatment, for example, with barium. This will be seen, for example, from FIG. 1, which shows a diagram in which the capacity in Ah/100g. Ni is plotted on the ordinate and the number of cycles on the abscissa. As is distinctly seen, the capacity curve B, which is a function of the number of cycles for compound treated with barium, lies considerably above curve A for the same function of the capacity of untreated standard compound.

4. If barium is added in the right way, the sulphate is bound inside the particles of compound. Through correct treatment with barium, instead of sulphate groups forming on the surfaces of the grains of the compound, the sulphate groups become distributed in the crystal lattice and a freer path is thereby obtained for the migration of ions through the compound, which improves the loading characteristics, especially in cold.

It is of great importance that the metallic compound which is to yield the difficulty soluble sulphate, for example barium, is introduced into the system before drying of the active compound. For if the metallic compound is introduced after the drying, the ions of the said metal react only with sulphate groups on the surfaces of the grains of the active compound and the desired doping or disturbance of the crystal lattice is obtained only in the surface layer, which has a very insignificant effect.

A relatively unsatisfactory result is obtained also if the doping metal, for example barium, is introduced before the washing or after incomplete washing. For in such case the metal ions are bound also on the sulphate-rich surfaces and no noticeable improvement is obtained in the electrochemical properties of the compound.

If on the other hand the doping metal, for example barium, is introduced before the drying in a Ni(OH)$_2$ suspension which is washed down to a relatively low sulphate content of 0.2 to about 1 percent, the doping metal ions do not find a sufficient number of sulphate ions on the surface but penetrate into the nucleus of the grains or of the water-rich amorphous lumps. After the drying the metal sulphate is then evenly distributed in the grains and causes a manifest disturbance of the lattice, which produces the desired electrochemical effect.

The investigations on which the invention is based have shown that the continuous precipitation method for electrochemically active material consisting essentially of nickel hydroxide is the most suitable for application of the invention. With this method of precipitation the doping metal, for example in the form of a barium hydroxide solution, can be introduced into the nickel hydroxide precipitate suspended in the washing water, whereby intimate mixing is readily obtained between the two hydroxides.

As pointed out in our application 1368/1969, compounds with predominantly amorphous structure provide a considerably higher initial capacity than a normal standard compound, whereas tests of charging and discharging voltages and loading characteristics yield a normal result. On the other hand the residual sulphate in the amorphous precipitate is almost impossible to wash out entirely. A predominantly crystalline precipitate, on the contrary, produces a lower initial capacity than a normal standard compound, but on the other hand the residual sulphate can be almost completely washed out, although this takes a long time.

The present invention offers the means of neutralizing the aforementioned disadvantage of amorphous precipitates, so resulting in a considerably higher initial capacity than is possible with the predominantly crystalline compounds, while the life curve runs essentially parallel to that of the standard compound, being considerably above the latter even after more than 400 cycles.

FIG. 2 shows the result of barium treatment of some compounds. On the ordinate is plotted in this case also the capacity expressed in Ah/100 g. Ni, the number of cycles being plotted on the abscissa. The fully drawn curve A shows in this case as well the life curve for a standard compound. Curve B is the life curve for a compound produced by continuous precipitation but without fixation of residual sulphate according to the invention. Curve C, finally, shows a compound closely similar to that of which the life curve is illustrated by curve B, but treated with barium. As is seen, the life curve C of the barium-treated compound is parallel to the life curve A of the standard compound and has a capacity about 8 to 10 percent above the latter.

Although the invention has been described with reference to two of its embodiments, it can be arbitrarily varied within the scope of the subsequent claims.

I claim:

1. Electrochemically active material consisting essentially of nickel hydroxide for use as a positive electrode in alkaline accumulators, said electrochemically active material containing from 0.05 to 5.0 percent by weight, based on the weight of said nickel hydroxide, of a sulphate of at least one metal selected from the group consisting of barium, strontium, mercury and antimony, said electrochemically active material being substantially free of residual alkali metal sulphate.

2. The electrochemically active material of claim 1 wherein said metal sulphate is rigidly fixed in the crystal lattice of the nickel hydroxide active material.

3. The electrochemically active material of claim 2 wherein said electrochemically active material contains from 0.25 to 0.50 percent by weight, based on the weight of said nickel hydroxide, of said metal sulphate.

4. In a method for the production of an electrochemically active material consisting essentially of nickel hydroxide for use as a positive electrode in alkaline accumulators, said method comprising precipitating nickel hydroxide from a nickel salt solution containing at least nickel sulphate with the aid of an alkali metal hydroxide solution, whereby a precipitate is formed which contains nickel hydroxide and residual alkali metal sulphate, washing said precipitate and drying said precipitate, the improvement which consists essentially of adding to said nickel hydroxide, before said drying step, a compound of a metal selected from the group consisting of barium, strontium, mercury and antimony, said metal forming a difficulty soluble metal sulphate, said compound of said metal being added in a sufficient amount to provide from 0.05 to 5.0 weight percent, based on the weight of said nickel hydroxide, of said metal sulphate in said nickel hydroxide, wherein said nickel hydroxide is substantially free of residual alkali metal sulphate.

5. The method of claim 4 wherein said compound of said metal is added to said nickel hydroxide after said washing step.

6. The method of claim 5 wherein said compound of said metal is a metal hydroxide.

7. The method of claim 4 wherein said compound of said metal is added to said nickel hydroxide in a sufficient amount to provide from 0.25 to 0.50 percent by weight, based on the weight of said nickel hydroxide, of said metal sulphate in said nickel hydroxide.

* * * * *